United States Patent [19]

MacMillan

[11] 4,063,364
[45] Dec. 20, 1977

[54] TURNING RADIUS PLATES AND SCALES FOR AUTOMOTIVE WHEEL ALIGNMENT MEASUREMENTS

[76] Inventor: Charles W. MacMillan, 3400 20th St. Ct., Rock Island, Ill. 61201

[21] Appl. No.: 686,403

[22] Filed: May 14, 1976

[51] Int. Cl.² .............................................. G01B 5/24
[52] U.S. Cl. .................................................. 33/203.14
[58] Field of Search ........................ 33/203.12, 203.14

[56] References Cited

U.S. PATENT DOCUMENTS

| 1,927,488 | 9/1933 | Christensen et al. | 33/203.12 |
| 2,080,909 | 5/1937 | Charlton | 33/203.14 |
| 3,231,983 | 2/1966 | Bender | 33/203.12 X |
| 3,363,322 | 1/1968 | Love | 33/203.14 |

FOREIGN PATENT DOCUMENTS

1,158,027  7/1958  France ........................... 33/203.12

*Primary Examiner*—Charles E. Phillips

[57] ABSTRACT

This invention pertains to portable automotive wheel alignment equipment including full floating turning radius plates incorporating T F E — fluorocarbon antifriction means as a requisite for minimum height thereof, and coordinated wheel turning scales whereby accurate wheel swing angles are determined by parallel orientation of a substantially long indictor rod with angular lines of the scales over substantial length thereof, the accurate determination of said wheel swing angles being the basis for measurement of caster, steering axis inclination, and toe-out-on-turns of a pair of vehicle wheels.

2 Claims, 17 Drawing Figures

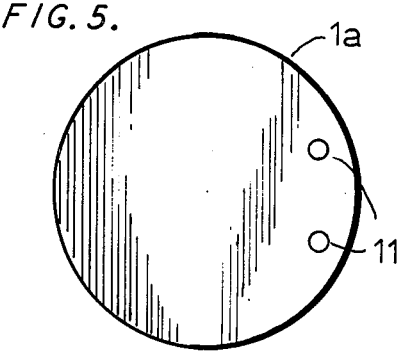
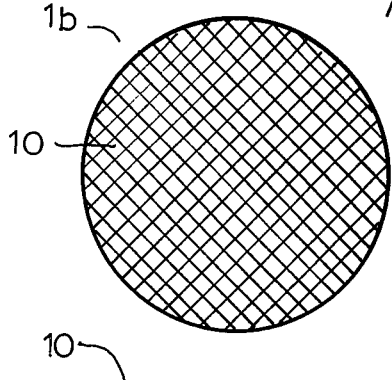
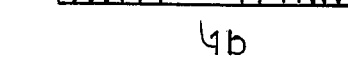
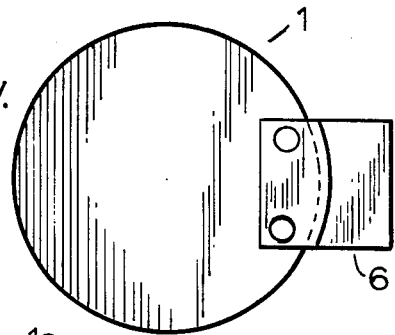
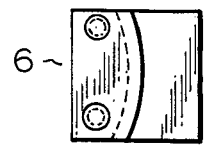
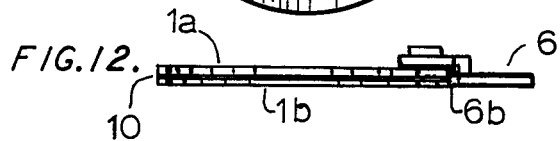
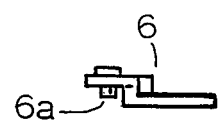
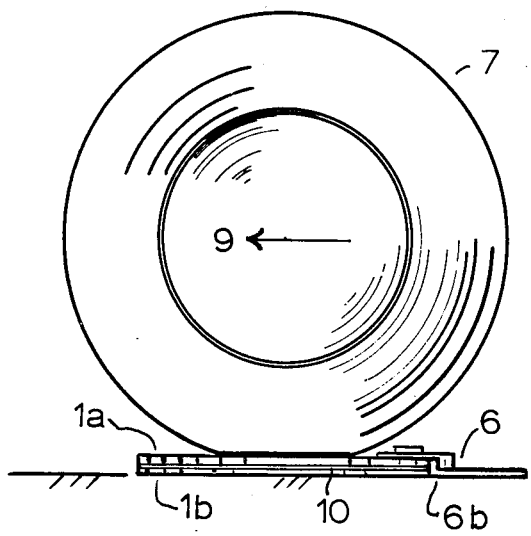
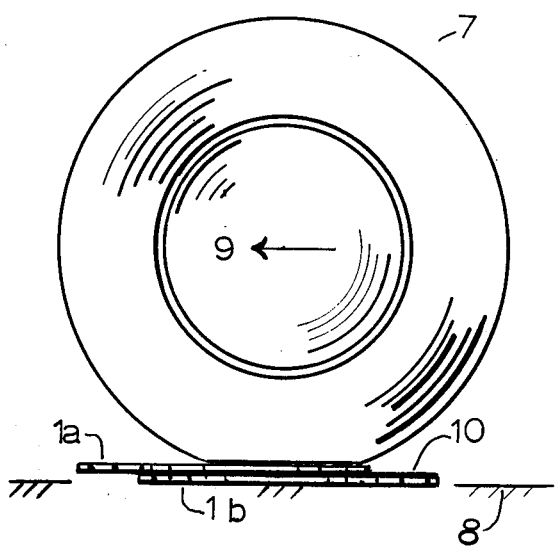

TURNING RADIUS PLATES AND SCALES FOR AUTOMOTIVE WHEEL ALIGNMENT MEASUREMENTS

BACKGROUND OF THE INVENTION

Conventional wheel alignment turning radius plates are usually heavy and inconvenient to move, clean, and handle. Their weight and bulkiness make them unacceptable for use in a light-weight, portable set of alignment equipment. The need for this type of set exists in service stations of limited space, in field safety test work, in private service operations, and as an accurate back-up capability for large alignment installations.

Furthermore, most existing portable equipment of this type includes turning radius plates of the semifloating type which have the distinct disadvantage of promoting errors when making caster readings. This is due to the fact that most vehicle front wheels do not turn on a pivot point under the tire when the wheel is steered or swung as when taking a caster reading. The scuff radius associated with most front wheels makes it mandatory that full-floating turn plates be used if rolling of the wheel on the plate is to be avoided while the wheel is swung. Since taking caster readings, as well as toe-out-on-turns readings, depend for their accuracy on exact swing angles (usually 20° each way) from zero (straight ahead), unacceptable errors may occur if the wheel rolls on the plate thus making the operator swing the wheel farther than the specified amount which the turning scale then erroneously indicates. It can easily be shown that a one degree error in wheel swing each side of zero will produce an error of close to 5 percent for any caster reading. Thus an error of two degrees in said swing angles results in a 10 percent error in caster, and similarly a 4° error in swing angle produces a 20 percent error in the caster reading.

For the above reasons, and as a result of two discoveries a new set of turning radius plates and swing angle indicators has been developed. It has been found that two thin aluminum (or other rigid material) plates when properly processed will effectively act as turn tables for the heaviest vehicles. Furthermore, these plates function effectively as full-floating due to a low-friction, interfaced material between them. It has been found that when one of said plates (preferably the lower one) is coated with tetraflouroethylene (TFE) in the form of resin or impregnated fibres the frictional resistance to the turning of one plate on the other is reduced to a very satisfactory level. The TFE material may be in the form of woven fabric and same may be applied to the plate by an epoxy paste mix or other similar means to achieve a permanent dry coating. Since the tow plates of a single turn table are not fastened together in any way, they may be instantly cleaned if necessary by a few wiping strokes. The T.F.E. fabric need be only 0.005 to 0.010 inch in thickness. Liquid deposition of TFE may also be use satisfactorily. It has been found that only one plate should be coated with TFE to attain minimum friction, thus providing a sliding interface between this material and bare, smooth metal. The coefficient of friction thus attained is approximately 0.02 which represents a 90 percent reduction from the coefficient of friction encountered between two bare metal plates. Thus the full-floating, load carrying requirement for such plates is obtained in an exceptionally thin device. For example, turning plates found thru tests to be fully practical are merely one-quarter of an inch in overall height, consisting of two one-eighth inch thick discs.

The thin profile of the turn tables described is also advantageous due to the small difference of one-quarter inch or less between front and rear wheel elevation when the vehicle being tested rests on a level plane. The small rise of the front wheels above the plane of the rear wheels due to the turn table thickness produces an error in caster of less than one-eighth of a degree which may be neglected. This is in contrast to other turning plates which are usually one inch or more in height thus requiring an adjustment of either the front or rear of the vehicle support plane. If such adjustment is not made when using conventional turn tables a caster error of one-half degree or greater will result.

In addition it has been discovered that errors in wheel swing angles as previously discussed herein may be fully eliminated by providing separated wheel swing angle scales. This is accomplished by also providing a moving scales indicator in the form of a horizontally supported rod attached to the wheel itself. Thus the actual number of degrees thru which the wheel is swung are also traversed by said indicator rod. Visual alignment of this horizontal rod with an angular scale line produces an accurate indication of the wheel swing angle since the scale and its angular lines act as a fixed base of reference separated from the wheel and turn table.

DESCRIPTION OF THE DRAWINGS

FIG. 5 is a plan view of an upper turning plate.
FIG. 6 is a front elevation of FIG. 5.
FIG. 7 is a plan view of a lower turn table plate.
FIG. 8 is an elevation of FIG. 7.
FIG. 9 is a plan view of a run-on cleat.
FIG. 10 is a side elevation of FIG. 9.
FIG. 11 is a plan view of an assemblage of the elements of FIGS. 5, 7, and 9.
FIG. 12 is a side elevation of FIG. 11.
FIG. 13 is an operational view of a wheel supported on the turning plate assemblage views of FIGS. 11 and 12.
FIG. 14 is an illustration of a wheel running onto the turn table without use of the cleat of FIGS. 9 and 10.

DETAILED DESCRIPTION

Figure 1:
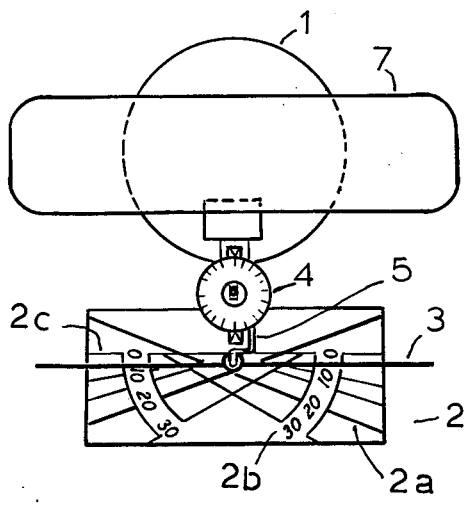
FIG. 1 is an operational plan view.

The elements illustrated comprise a turntable 1, a special protractor type of scale 2, indicating rod 3, support member or alignment gage 4, adjustable support linkage 5, run-on cleat 6, and vehicle wheel 7, all supported on horizontal floor plane 8.

Support member 4 illustrates a caster-camber, steering-axis gage as fully described in my U.S. Pat. No. 3,956,830. However, any similar gage may be used if it incorporates means for supporting adjustable linkage 5 and indicator rod 3. Gage 4 may be attached to the vehicle wheel by any conventional means such as a magnet or clamp.

Cleat 6 consists of a base portion having an upwardly extending portion for contact with an edge of the lower plate at 6b and having a portion extending normal to said upwardly extending portion which portion has downwardly extending pins 6a engagable in holes 11.

The upper plate 1a of a turntable is preferably a plain metal disc, but may be non-circular, containing holes 11 for receiving pins 6a of cleat 6. These pins extend downwardly from cleat 6 slightly less than the thickness of plate 1a so as not to extend thru the latter. Lower plate 1b is permanently coated with T F E as indicated by 10 and the crossed diagonal lines in FIG. 7.

The purpose of cleat 6 is illustrated in FIG. 13 and FIG. 14. When vehicle wheel 7, traveling in direction 9 is stopped on plate 1a, cleat 6 prevents sliding of 1a on 1b thru contact at 6b with the periphery of 1b. Without cleat 6 an undesirable movement of plate 1a on plate 1b occurs when the vehicle brakes are applied as illustrated in FIG. 14.

Indicator rod 3 is suspended by adjustable linkage 5 and may be locked in a rigid position relative to vehicle wheel 7 by tightening thumb screws 5a, 5b, and 5c, thus locking movable members 5d, 5e, and rod 3 in their adjusted positions.

Figure 15:
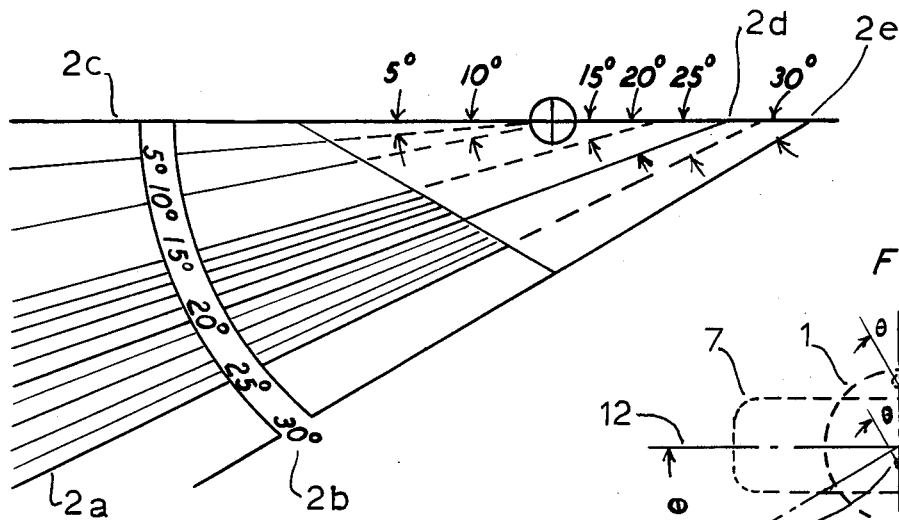
FIG. 15 is a geometric explanation of a wheel swing and turning radius scale construction.

Angle indicator plate 2 contains graduated, angular lines 2a and numerical degree indications 2b. The construction of lines 2a is illustrated by FIG. 15. This construction provides accurate angular indications of wheel swing by visual alignment of indicator rod 3 with any of said lines. Various degree graduation lines shown as 5° thru 30° are established with a base line 2c. However, the apexes of these angles such as 2d and 2e do not coincide but are distributed along the base line 2c as illustrated. This construction provides a set of graduated angular lines which conform naturally to the swung positions of indicator rod 3 as the vehicle wheel is swung on turning plate 1a. Furthermore the angular lines 2a, so arranged, provide relatively large separation from each other thus permitting easy and accurate use thereof.

Figure 4:
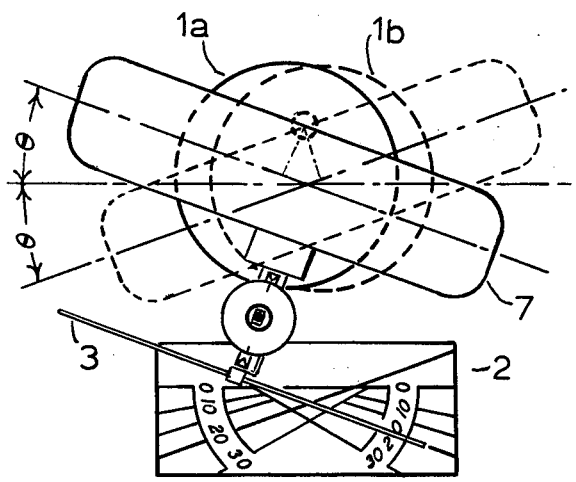
FIG. 4 is an operational plan view.
Figure 2:
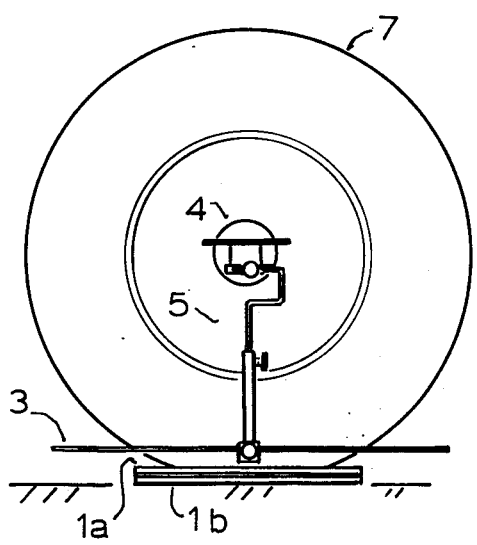
FIG. 2 is an elevation of FIG. 1.
Figure 3:
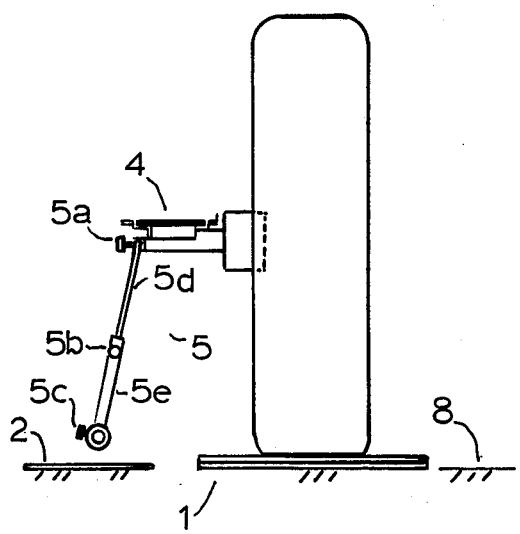
FIG. 3 is a side elevation of FIG. 2.
Figure 16:
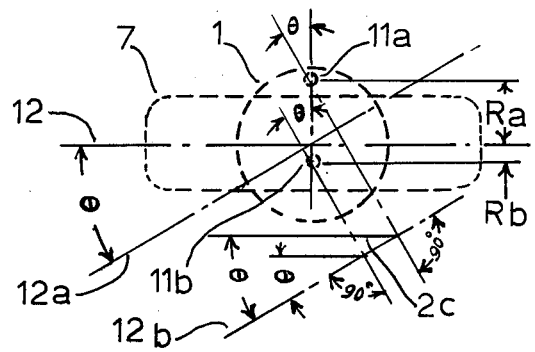
FIG. 16 is a descriptive operational plan view of wheel swing angles as related to FIG. 15.

A geometric analysis of wheel swing as applied to this invention is shown by FIG. 16 in which $\theta$ is any angle of swing. Since the point on the ground about which a wheel pivots (when swung or steered) lies on a downward projection of the steering axis, this point is seldom located directly under the center of the tire. Rather, it is off center as illustrated by 11a or 11b thus creating what is called a scuff radius as indicated by Ra or Rb. The resulting action when the wheel is swung produces displacement of the upper plate 1a from concentricity with lower plate 1b as illustrated in FIG. 4. The provision for plate motion in any direction in a horizontal plane (or free floating) thus allows the wheel to swing with the upper plate without rolling thereon under some normal conditions. However, when wheels are swung manually, by grasping the wheel itself and not by use of the vehicle steering-wheel some rolling may occur due to friction in the steering system or in the turntables or in both. Furthermore, since locking the brakes is an operation often by-passed or ignored by operators, errors in caster readings and toe-out-on-turns readings often occur. These difficulties are completely eliminated in the present invention since the angle $\theta$, FIG. 16, between wheel centerline 12 and 12a representing a wheel swingangle becomes accurately indicated. Such an angle becomes indicated on the independent scale of FIG. 15 when indicator rod 3 is brought into coincident parallelism with any line thereon. Any position of said indicator rod is represented by line 12b which is fixed with relation to 12a. The indicator rod thus moves thru an identical angle $\theta$ with the wheel regardless of the position of pivot point 11a or 11b and regardless of any turning of the wheel on its spindle with consequent wheel rolling on plate 1a during the operation.

Figure 17:
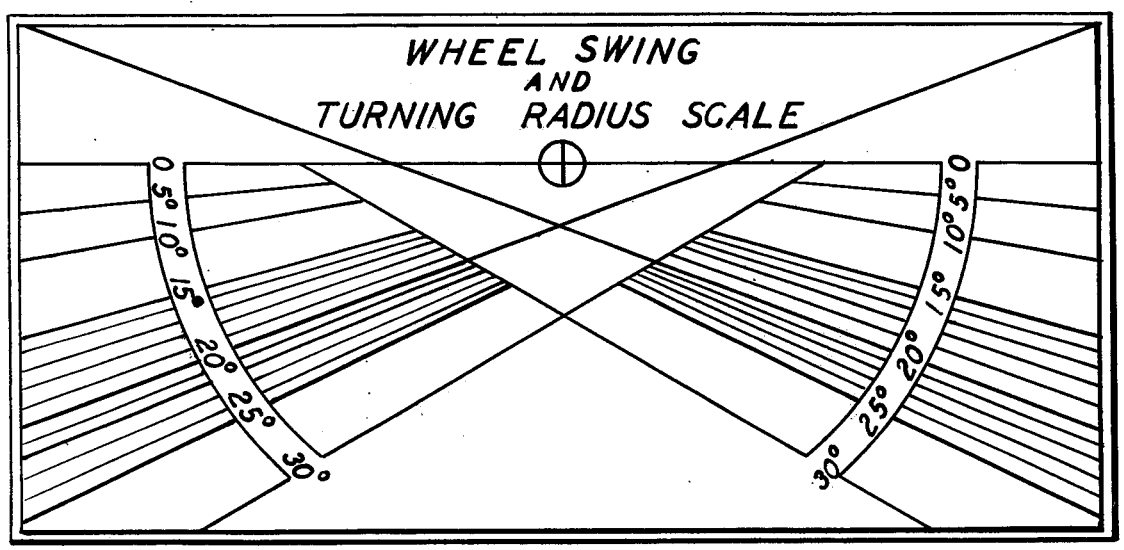
FIG. 17 is a plan view of one of an identical pair of angular scales forming part of the invention.

The symmetrical left and right plan of the wheel swing scale of FIG. 15 is illustrated in the complete scale of FIG. 17.

I claim:

1. In a vehicle wheel alignment test system for determining caster, camber, steering-axis-inclination, and steering geometry angles of a pair of dirigible wheels the combination comprising:

a turntable consisting of a top flat plate superimposed and slidable on a lower flat plate, said top plate having hole means therein; a detachable cleat having a base portion, an upwardly extending portion for contacting an edge of said lower plate and a portion extending normal to said upwardly extending portion which portion has downwardly extending means for extending into said hole means;

a steering angle indicating means comprising a scale and an indicator, said scale comprising a base line and two symmetrical sets of lines whose extensions intersect said base line at different points there along; and, a substantially horizontal indicator rod suspended immediately above said scale and adjustably supported by a vehicle wheel for visual parallel alignment of said rod with the lines of said scale to determine the turning angle of said wheel.

2. The combination of claim 1 wherein said downwardly extending means of said cleat comprise at least one round pin, said holes means consists of a round hole, and said upwardly extending portion consists of a concave arcuate portion.

* * * * *